United States Patent
Hagiwara et al.

(10) Patent No.: US 8,649,065 B2
(45) Date of Patent: Feb. 11, 2014

(54) IMAGE PROCESSING APPARATUS, IMAGE PROCESSING METHOD, AND HALFTONE PROCESSING

(75) Inventors: Katsuyuki Hagiwara, Tokyo (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 418 days.

(21) Appl. No.: 12/975,022

(22) Filed: Dec. 21, 2010

(65) Prior Publication Data
US 2011/0157655 A1 Jun. 30, 2011

(30) Foreign Application Priority Data

Dec. 28, 2009 (JP) .................................. 2009-298745
Oct. 7, 2010 (JP) .................................. 2010-227679

(51) Int. Cl.
*G06K 9/40* (2006.01)
*G06T 5/00* (2006.01)
*H04N 1/40* (2006.01)
*G06K 15/00* (2006.01)

(52) U.S. Cl.
USPC ....... 358/3.26; 358/3.06; 358/3.27; 358/3.22; 382/254; 382/255; 382/264; 382/275

(58) Field of Classification Search
USPC ............... 358/1.9, 3.06, 2.1, 3.21, 3.22, 3.26, 358/3.27; 382/254, 255, 264, 275
See application file for complete search history.

(56) References Cited

U.S. PATENT DOCUMENTS

| | | | |
|---|---|---|---|
| 7,064,862 B2 * | 6/2006 | Takashimizu | 358/1.9 |
| 2009/0097776 A1 | 4/2009 | Fukamachi et al. | |
| 2011/0122451 A1 * | 5/2011 | Tsutsumi et al. | 358/3.06 |
| 2012/0086986 A1 | 4/2012 | Hara | |

FOREIGN PATENT DOCUMENTS

| | | |
|---|---|---|
| EP | 500174 A1 | 8/1992 |
| EP | 878959 A2 | 11/1998 |
| EP | 1126693 A1 | 8/2001 |
| JP | 9-238259 A | 9/1997 |
| JP | 2001-086355 A | 3/2001 |
| JP | 2007-129558 A | 5/2007 |

* cited by examiner

*Primary Examiner* — Barbara Reinier
(74) *Attorney, Agent, or Firm* — Canon USA, Inc., IP Division

(57) ABSTRACT

An image processing apparatus includes a first halftone processor, a first filtering processor, a second filtering processor, and an evaluator. The first halftone processor generates first halftone image data from input image data using thresholds. The first filtering processor smoothes the first halftone image data using a first filter having a size corresponding to a cycle of the thresholds. The second filtering processor smoothes the input image data using a second filter having a characteristic corresponding to the first filter. The evaluator evaluates a moiré caused in the first halftone image data based on a difference between the first halftone image data smoothed by the first filtering processor and the image data smoothed by the second filtering processor.

17 Claims, 23 Drawing Sheets

FIG. 2

|   | 0 | 1 | 2 | 3 |
|---|---|---|---|---|
| 0 | 4, 132 | 100, 228 | 20, 148 | 116, 244 |
| 1 | 68, 196 | 36, 164 | 84, 212 | 52, 180 |
| 2 | 28, 156 | 124, 252 | 12, 140 | 108, 236 |
| 3 | 92, 220 | 60, 188 | 76, 204 | 44, 172 |

FIG. 3

| 255 | 191 | 128 | 255 | 191 | 128 | 255 | 191 | 128 | 255 | 191 | 128 | 255 | 191 | 128 | 255 | 191 |
|-----|-----|-----|-----|-----|-----|-----|-----|-----|-----|-----|-----|-----|-----|-----|-----|-----|
| 191 | 128 | 64  | 191 | 128 | 64  | 191 | 128 | 64  | 191 | 128 | 64  | 191 | 128 | 64  | 191 | 128 |
| 128 | 64  | 0   | 128 | 64  | 0   | 128 | 64  | 0   | 128 | 64  | 0   | 128 | 64  | 0   | 128 | 64  |
| 255 | 191 | 128 | 255 | 191 | 128 | 255 | 191 | 128 | 255 | 191 | 128 | 255 | 191 | 128 | 255 | 191 |
| 191 | 128 | 64  | 191 | 128 | 64  | 191 | 128 | 64  | 191 | 128 | 64  | 191 | 128 | 64  | 191 | 128 |
| 128 | 64  | 0   | 128 | 64  | 0   | 128 | 64  | 0   | 128 | 64  | 0   | 128 | 64  | 0   | 128 | 64  |
| 255 | 191 | 128 | 255 | 191 | 128 | 255 | 191 | 128 | 255 | 191 | 128 | 255 | 191 | 128 | 255 | 191 |
| 191 | 128 | 64  | 191 | 128 | 64  | 191 | 128 | 64  | 191 | 128 | 64  | 191 | 128 | 64  | 191 | 128 |
| 128 | 64  | 0   | 128 | 64  | 0   | 128 | 64  | 0   | 128 | 64  | 0   | 128 | 64  | 0   | 128 | 64  |
| 255 | 191 | 128 | 255 | 191 | 128 | 255 | 191 | 128 | 255 | 191 | 128 | 255 | 191 | 128 | 255 | 191 |
| 191 | 128 | 64  | 191 | 128 | 64  | 191 | 128 | 64  | 191 | 128 | 64  | 191 | 128 | 64  | 191 | 128 |
| 128 | 64  | 0   | 128 | 64  | 0   | 128 | 64  | 0   | 128 | 64  | 0   | 128 | 64  | 0   | 128 | 64  |
| 255 | 191 | 128 | 255 | 191 | 128 | 255 | 191 | 128 | 255 | 191 | 128 | 255 | 191 | 128 | 255 | 191 |
| 191 | 128 | 64  | 191 | 128 | 64  | 191 | 128 | 64  | 191 | 128 | 64  | 191 | 128 | 64  | 191 | 128 |
| 128 | 64  | 0   | 128 | 64  | 0   | 128 | 64  | 0   | 128 | 64  | 0   | 128 | 64  | 0   | 128 | 64  |
| 255 | 191 | 128 | 255 | 191 | 128 | 255 | 191 | 128 | 255 | 191 | 128 | 255 | 191 | 128 | 255 | 191 |
| 191 | 128 | 64  | 191 | 128 | 64  | 191 | 128 | 64  | 191 | 128 | 64  | 191 | 128 | 64  | 191 | 128 |
| 255 | 191 | 128 | 255 | 191 | 128 | 255 | 191 | 128 | 255 | 191 | 128 | 255 | 191 | 128 | 255 | 191 |

| 2 | 2 | 1 | 2 | 1 | 1 | 2 | 2 | 1 | 2 | 1 | 1 | 2 | 2 | 1 | 2 |
|---|---|---|---|---|---|---|---|---|---|---|---|---|---|---|---|
| 1 | 0 | 0 | 1 | 1 | 0 | 1 | 0 | 0 | 1 | 1 | 0 | 1 | 0 | 0 | 1 |
| 1 | 1 | 0 | 2 | 1 | 1 | 1 | 0 | 2 | 1 | 1 | 1 | 1 | 0 | 2 | 1 |
| 2 | 1 | 1 | 2 | 2 | 1 | 2 | 1 | 2 | 2 | 1 | 2 | 1 | 1 | 2 | 1 |
| 1 | 1 | 0 | 1 | 0 | 0 | 1 | 0 | 1 | 0 | 0 | 1 | 1 | 0 | 1 | 1 |
| 2 | 1 | 1 | 1 | 0 | 2 | 1 | 1 | 1 | 0 | 2 | 1 | 1 | 1 | 0 | 2 |
| 2 | 2 | 1 | 2 | 1 | 1 | 2 | 2 | 1 | 2 | 1 | 1 | 2 | 2 | 1 | 2 |
| 1 | 0 | 0 | 1 | 1 | 0 | 1 | 0 | 0 | 1 | 1 | 0 | 1 | 0 | 0 | 1 |
| 1 | 1 | 0 | 2 | 1 | 1 | 1 | 0 | 2 | 1 | 1 | 1 | 1 | 0 | 2 | 1 |
| 2 | 1 | 1 | 2 | 2 | 1 | 2 | 1 | 2 | 2 | 1 | 2 | 1 | 1 | 2 | 1 |
| 1 | 1 | 0 | 1 | 0 | 0 | 1 | 1 | 0 | 1 | 0 | 0 | 1 | 1 | 0 | 1 |
| 2 | 1 | 1 | 1 | 0 | 2 | 1 | 1 | 1 | 0 | 2 | 1 | 1 | 1 | 0 | 2 |
| 2 | 2 | 1 | 2 | 1 | 1 | 2 | 2 | 1 | 2 | 1 | 1 | 2 | 2 | 1 | 2 |
| 1 | 0 | 0 | 1 | 1 | 0 | 1 | 0 | 0 | 1 | 1 | 0 | 1 | 0 | 0 | 1 |
| 1 | 1 | 0 | 2 | 1 | 1 | 1 | 0 | 2 | 1 | 1 | 1 | 1 | 0 | 2 | 1 |
| 2 | 1 | 1 | 2 | 2 | 1 | 2 | 1 | 2 | 2 | 1 | 2 | 1 | 1 | 2 | 1 |

| FILTERING-TARGET PIXEL | FILTERING-TARGET PIXEL | FILTERING-TARGET PIXEL | FILTERING-TARGET PIXEL |
|---|---|---|---|
| FILTERING-TARGET PIXEL | FILTERING-TARGET PIXEL | FILTERING-TARGET PIXEL | FILTERING-TARGET PIXEL |
| FILTERING-TARGET PIXEL | FILTERING-TARGET PIXEL | TARGET PIXEL | FILTERING-TARGET PIXEL |
| FILTERING-TARGET PIXEL | FILTERING-TARGET PIXEL | FILTERING-TARGET PIXEL | FILTERING-TARGET PIXEL |

| 12 | 12 | 15 | 14 | 13 | 17 | 14 | 11 | 15 | 14 | 13 | 17 | 14 | 11 | 15 | 11 |
|---|---|---|---|---|---|---|---|---|---|---|---|---|---|---|---|
| 16 | 16 | 19 | 18 | 17 | 21 | 18 | 15 | 19 | 18 | 17 | 21 | 18 | 15 | 19 | 15 |
| 12 | 12 | 15 | 14 | 13 | 17 | 14 | 11 | 15 | 14 | 13 | 17 | 14 | 11 | 15 | 11 |
| 16 | 16 | 18 | 16 | 14 | 18 | 16 | 14 | 18 | 16 | 14 | 18 | 16 | 14 | 18 | 14 |
| 20 | 20 | 21 | 18 | 15 | 19 | 18 | 17 | 21 | 18 | 15 | 19 | 18 | 17 | 21 | 17 |
| 16 | 16 | 17 | 14 | 11 | 15 | 14 | 13 | 17 | 14 | 11 | 15 | 14 | 13 | 17 | 13 |
| 16 | 16 | 18 | 16 | 14 | 18 | 16 | 14 | 18 | 16 | 14 | 18 | 16 | 14 | 18 | 14 |
| 16 | 16 | 19 | 18 | 17 | 21 | 18 | 15 | 19 | 18 | 17 | 21 | 18 | 15 | 19 | 15 |
| 12 | 12 | 15 | 14 | 13 | 17 | 14 | 11 | 15 | 14 | 13 | 17 | 14 | 11 | 15 | 11 |
| 16 | 16 | 18 | 16 | 14 | 18 | 16 | 14 | 18 | 16 | 14 | 18 | 16 | 14 | 18 | 14 |
| 20 | 20 | 21 | 18 | 15 | 19 | 18 | 17 | 21 | 18 | 15 | 19 | 18 | 17 | 21 | 17 |
| 16 | 16 | 17 | 14 | 11 | 15 | 14 | 13 | 17 | 14 | 11 | 15 | 14 | 13 | 17 | 13 |
| 16 | 16 | 18 | 16 | 14 | 18 | 16 | 14 | 18 | 16 | 14 | 18 | 16 | 14 | 18 | 14 |
| 16 | 16 | 19 | 18 | 17 | 21 | 18 | 15 | 19 | 18 | 17 | 21 | 18 | 15 | 19 | 15 |
| 12 | 12 | 16 | 16 | 16 | 20 | 16 | 12 | 16 | 16 | 16 | 20 | 16 | 12 | 16 | 12 |
| 12 | 12 | 16 | 16 | 16 | 20 | 16 | 12 | 16 | 16 | 16 | 20 | 16 | 12 | 16 | 12 |

FIG. 8

| 2043 | 2043 | 2297 | 1788 | 2297 | 2043 | 1788 | 2297 | 2043 | 1788 | 2297 | 2043 | 1788 | 1788 |
| --- | --- | --- | --- | --- | --- | --- | --- | --- | --- | --- | --- | --- | --- |
| 2297 | 2043 | 2297 | 1788 | 2297 | 2043 | 1788 | 2297 | 2043 | 1788 | 2297 | 2043 | 1788 | 1788 |
| 1788 | 1788 | 2552 | 2043 | 2552 | 2297 | 2043 | 2552 | 2297 | 2043 | 2552 | 2297 | 2043 | 2043 |
| 2297 | 2043 | 2297 | 1788 | 2297 | 2043 | 1788 | 2297 | 2043 | 1788 | 2297 | 2043 | 1788 | 1788 |
| 2043 | 1788 | 2043 | 1533 | 2043 | 1788 | 1533 | 2043 | 1788 | 1533 | 2043 | 1788 | 1533 | 1533 |
| 1788 | 2297 | 2552 | 2043 | 2552 | 2297 | 2043 | 2552 | 2297 | 2043 | 2552 | 2297 | 2043 | 2043 |
| 2297 | 2043 | 2297 | 1788 | 2297 | 2043 | 1788 | 2297 | 2043 | 1788 | 2297 | 2043 | 1788 | 1788 |
| 2043 | 1788 | 2043 | 1533 | 2043 | 1788 | 1533 | 2043 | 1788 | 1533 | 2043 | 1788 | 1533 | 1533 |
| 1788 | 2297 | 2552 | 2043 | 2552 | 2297 | 2043 | 2552 | 2297 | 2043 | 2552 | 2297 | 2043 | 2043 |
| 2297 | 2043 | 2297 | 1788 | 2297 | 2043 | 1788 | 2297 | 2043 | 1788 | 2297 | 2043 | 1788 | 1788 |
| 2043 | 1788 | 2043 | 1533 | 2043 | 1788 | 1533 | 2043 | 1788 | 1533 | 2043 | 1788 | 1533 | 1533 |
| 1788 | 2297 | 2552 | 2043 | 2552 | 2297 | 2043 | 2552 | 2297 | 2043 | 2552 | 2297 | 2043 | 2043 |
| 2297 | 2043 | 2297 | 1788 | 2297 | 2043 | 1788 | 2297 | 2043 | 1788 | 2297 | 2043 | 1788 | 1788 |
| 1788 | 1788 | 2043 | 1788 | 2043 | 1788 | 1788 | 2043 | 1788 | 1788 | 2043 | 1788 | 1788 | 1533 |

FIG. 9

| -1026 | -1026 | -514 | -6 | 504 | 506 | -6 | -516 | -514 | -6 | 504 | 506 | -6 | -516 | -514 | -516 |
|---|---|---|---|---|---|---|---|---|---|---|---|---|---|---|---|
| -1026 | -1026 | -514 | -6 | 504 | 506 | -6 | -516 | -514 | -6 | 504 | 506 | -6 | -516 | -514 | -516 |
| -514 | -514 | -259 | -4 | 249 | 251 | -4 | -261 | -259 | -4 | 249 | 251 | -4 | -261 | -259 | -261 |
| -6 | -6 | -4 | -6 | -6 | -4 | -6 | -6 | -4 | -6 | -6 | -4 | -6 | -6 | -4 | -6 |
| 504 | 504 | 249 | -6 | -261 | -261 | -6 | 249 | 249 | -6 | -261 | -261 | -6 | 249 | 249 | 249 |
| 506 | 506 | 251 | -4 | -261 | -259 | -4 | 249 | 251 | -4 | -261 | -259 | -4 | 249 | 251 | 249 |
| -6 | -6 | -4 | -6 | -6 | -4 | -6 | -6 | -4 | -6 | -6 | -4 | -6 | -6 | -4 | -6 |
| -516 | -516 | -261 | -6 | 249 | 249 | -6 | -261 | -261 | -6 | 249 | 249 | -6 | -261 | -261 | -261 |
| -514 | -514 | -259 | -4 | 249 | 251 | -4 | -261 | -259 | -4 | 249 | 251 | -4 | -261 | -259 | -261 |
| -6 | -6 | -4 | -6 | -6 | -4 | -6 | -6 | -4 | -6 | -6 | -4 | -6 | -6 | -4 | -6 |
| 504 | 504 | 249 | -6 | -261 | -261 | -6 | 249 | 249 | -6 | -261 | -261 | -6 | 249 | 249 | 249 |
| 506 | 506 | 251 | -4 | -261 | -259 | -4 | 249 | 251 | -4 | -261 | -259 | -4 | 249 | 251 | 249 |
| -6 | -6 | -4 | -6 | -6 | -4 | -6 | -6 | -4 | -6 | -6 | -4 | -6 | -6 | -4 | -6 |
| -516 | -516 | -261 | -6 | 249 | 249 | -6 | -261 | -261 | -6 | 249 | 249 | -6 | -261 | -261 | -261 |
| -514 | -514 | -259 | -4 | 249 | 251 | -4 | -261 | -259 | -4 | 249 | 251 | -4 | -261 | -259 | -261 |
| -516 | -516 | -261 | -6 | 249 | 249 | -6 | -261 | -261 | -6 | 249 | 249 | -6 | -261 | -261 | -261 |

FIG. 10

| 1 | 1 | 1 | 0 | 1 | 1 | 0 | 1 | 1 | 0 | 1 | 1 | 0 | 1 | 1 | 1 |
|---|---|---|---|---|---|---|---|---|---|---|---|---|---|---|---|
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |
| 1 | 1 | 1 | 0 | 1 | 1 | 0 | 1 | 1 | 0 | 1 | 1 | 0 | 1 | 1 | 1 |

FIG. 11

| 255 | 223 | 191 | 159 | 255 | 223 | 191 | 159 | 255 | 223 | 191 | 159 | 255 | 223 | 191 | 159 |
|---|---|---|---|---|---|---|---|---|---|---|---|---|---|---|---|
| 202 | 170 | 138 | 106 | 202 | 170 | 138 | 106 | 202 | 170 | 138 | 106 | 202 | 170 | 138 | 106 |
| 149 | 117 | 85 | 53 | 149 | 117 | 85 | 53 | 149 | 117 | 85 | 53 | 149 | 117 | 85 | 53 |
| 96 | 64 | 32 | 0 | 96 | 64 | 32 | 0 | 96 | 64 | 32 | 0 | 96 | 64 | 32 | 0 |
| 255 | 223 | 191 | 159 | 255 | 223 | 191 | 159 | 255 | 223 | 191 | 159 | 255 | 223 | 191 | 159 |
| 202 | 170 | 138 | 106 | 202 | 170 | 138 | 106 | 202 | 170 | 138 | 106 | 202 | 170 | 138 | 106 |
| 149 | 117 | 85 | 53 | 149 | 117 | 85 | 53 | 149 | 117 | 85 | 53 | 149 | 117 | 85 | 53 |
| 96 | 64 | 32 | 0 | 96 | 64 | 32 | 0 | 96 | 64 | 32 | 0 | 96 | 64 | 32 | 0 |
| 255 | 223 | 191 | 159 | 255 | 223 | 191 | 159 | 255 | 223 | 191 | 159 | 255 | 223 | 191 | 159 |
| 202 | 170 | 138 | 106 | 202 | 170 | 138 | 106 | 202 | 170 | 138 | 106 | 202 | 170 | 138 | 106 |
| 149 | 117 | 85 | 53 | 149 | 117 | 85 | 53 | 149 | 117 | 85 | 53 | 149 | 117 | 85 | 53 |
| 96 | 64 | 32 | 0 | 96 | 64 | 32 | 0 | 96 | 64 | 32 | 0 | 96 | 64 | 32 | 0 |
| 255 | 223 | 191 | 159 | 255 | 223 | 191 | 159 | 255 | 223 | 191 | 159 | 255 | 223 | 191 | 159 |
| 202 | 170 | 138 | 106 | 202 | 170 | 138 | 106 | 202 | 170 | 138 | 106 | 202 | 170 | 138 | 106 |
| 149 | 117 | 85 | 53 | 149 | 117 | 85 | 53 | 149 | 117 | 85 | 53 | 149 | 117 | 85 | 53 |
| 96 | 64 | 32 | 0 | 96 | 64 | 32 | 0 | 96 | 64 | 32 | 0 | 96 | 64 | 32 | 0 |

FIG. 12

| 174 | 174 | 2 | 2 | 2 | 2 | 2 | 2 | 2 | 2 | 2 | 2 | 2 | 2 | 2 | -170 |
|---|---|---|---|---|---|---|---|---|---|---|---|---|---|---|---|
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 172 | 172 | 0 | 0 | 0 | 0 | 0 | 0 | 0 | 0 | 0 | 0 | 0 | 0 | 0 | -172 |
| 170 | 170 | -2 | -2 | -2 | -2 | -2 | -2 | -2 | -2 | -2 | -2 | -2 | -2 | -2 | -174 |
| 170 | 170 | -2 | -2 | -2 | -2 | -2 | -2 | -2 | -2 | -2 | -2 | -2 | -2 | -2 | -174 |

FIG. 14

| 136 | 204 | 204 | 204 | 204 | 204 | 204 | 204 | 204 | 204 | 204 | 204 | 204 | 204 | 204 | 136 |
|---|---|---|---|---|---|---|---|---|---|---|---|---|---|---|---|
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 204 | 306 | 306 | 306 | 306 | 306 | 306 | 306 | 306 | 306 | 306 | 306 | 306 | 306 | 306 | 204 |
| 136 | 204 | 204 | 204 | 204 | 204 | 204 | 204 | 204 | 204 | 204 | 204 | 204 | 204 | 204 | 136 |

FIG. 16

| | | | | | | | | | | | | | | | |
|---|---|---|---|---|---|---|---|---|---|---|---|---|---|---|---|
| 0 | 0 | 1 | 0 | 0 | 1 | 0 | 0 | 0 | 0 | 0 | 0 | 0 | 0 | 1 | 0 |
| 0 | 0 | 0 | 0 | 0 | 0 | 0 | 0 | 1 | 0 | 0 | 0 | 0 | 0 | 0 | 1 |
| 0 | 0 | 0 | 0 | 0 | 0 | 0 | 0 | 0 | 1 | 0 | 0 | 0 | 0 | 0 | 0 |
| 0 | 0 | 1 | 0 | 1 | 0 | 0 | 0 | 0 | 0 | 0 | 1 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 1 | 0 | 0 | 0 | 0 |
| 0 | 0 | 1 | 0 | 0 | 0 | 0 | 1 | 0 | 0 | 0 | 0 | 0 | 0 | 0 | 0 |
| 0 | 0 | 0 | 0 | 1 | 0 | 0 | 0 | 0 | 1 | 0 | 0 | 0 | 1 | 0 | 0 |
| 0 | 0 | 0 | 0 | 0 | 0 | 0 | 0 | 0 | 1 | 0 | 0 | 0 | 0 | 0 | 0 |
| 0 | 0 | 1 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 1 | 0 | 0 | 0 | 1 | 0 |
| 0 | 0 | 0 | 0 | 0 | 0 | 0 | 0 | 1 | 0 | 0 | 1 | 0 | 0 | 0 | 0 |
| 0 | 0 | 1 | 0 | 0 | 0 | 0 | 0 | 0 | 0 | 0 | 0 | 0 | 0 | 0 | 0 |
| 0 | 0 | 0 | 1 | 0 | 0 | 1 | 0 | 0 | 1 | 0 | 0 | 1 | 0 | 0 | 1 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 17

| 0 | 1 | 1 | 1 | 1 | 1 | 1 | 1 | 1 | 1 | 0 | 0 | 0 | 1 | 2 | 2 |
|---|---|---|---|---|---|---|---|---|---|---|---|---|---|---|---|
| 0 | 1 | 1 | 1 | 1 | 1 | 1 | 1 | 1 | 2 | 1 | 1 | 0 | 1 | 2 | 2 |
| 0 | 1 | 1 | 2 | 1 | 1 | 0 | 1 | 1 | 2 | 1 | 2 | 1 | 1 | 1 | 1 |
| 0 | 1 | 1 | 2 | 2 | 2 | 1 | 0 | 0 | 1 | 1 | 2 | 1 | 1 | 0 | 0 |
| 0 | 1 | 1 | 2 | 2 | 2 | 2 | 1 | 1 | 0 | 0 | 1 | 2 | 2 | 1 | 0 |
| 0 | 1 | 1 | 1 | 1 | 1 | 2 | 2 | 2 | 1 | 0 | 0 | 1 | 1 | 1 | 0 |
| 0 | 1 | 1 | 2 | 1 | 1 | 1 | 2 | 3 | 2 | 1 | 0 | 1 | 2 | 2 | 1 |
| 0 | 1 | 1 | 2 | 1 | 1 | 0 | 1 | 2 | 3 | 2 | 1 | 0 | 1 | 1 | 1 |
| 0 | 1 | 1 | 2 | 2 | 2 | 1 | 0 | 1 | 2 | 2 | 1 | 0 | 1 | 1 | 1 |
| 0 | 1 | 1 | 1 | 1 | 2 | 2 | 1 | 0 | 1 | 2 | 2 | 1 | 0 | 1 | 1 |
| 0 | 1 | 1 | 1 | 1 | 2 | 2 | 2 | 1 | 1 | 1 | 2 | 2 | 1 | 1 | 1 |
| 0 | 1 | 1 | 1 | 0 | 1 | 1 | 2 | 1 | 1 | 1 | 2 | 2 | 1 | 1 | 1 |
| 0 | 1 | 2 | 2 | 1 | 1 | 1 | 2 | 2 | 2 | 1 | 2 | 2 | 2 | 1 | 1 |
| 0 | 1 | 2 | 2 | 1 | 1 | 1 | 1 | 1 | 1 | 1 | 1 | 1 | 1 | 1 | 1 |
| 0 | 0 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 |

FIG. 18

| -136 | -204 | -204 | -204 | -204 | -204 | -204 | -204 | -204 | -204 | -204 | -204 | -204 | -204 | -204 | -136 |
|------|------|------|------|------|------|------|------|------|------|------|------|------|------|------|------|
| -204 | -306 | -51  | -51  | -51  | -51  | -51  | -51  | -51  | -51  | -51  | -51  | -51  | -51  | -51  | 51   |
| -204 | -51  | 204  | 204  | -51  | -51  | -51  | -51  | -51  | -51  | -51  | -51  | -51  | 204  | -51  | 51   |
| -204 | -51  | 204  | 204  | -51  | -51  | 204  | 204  | 204  | 204  | 204  | 204  | 204  | 204  | -51  | 51   |
| -204 | -51  | -51  | -51  | -306 | -51  | 204  | 204  | -51  | -51  | 204  | 204  | -51  | -51  | -51  | 51   |
| -204 | -51  | -51  | -51  | -51  | 204  | 204  | 204  | -306 | -306 | -51  | -51  | -51  | -51  | -51  | 51   |
| -204 | -51  | -51  | 204  | -51  | 204  | -51  | -51  | 204  | 204  | -51  | -51  | 204  | 204  | -204 | 51   |
| -204 | -51  | -51  | 204  | -51  | -51  | 204  | 204  | 459  | 459  | -306 | -51  | 204  | 204  | -51  | 51   |
| -204 | -51  | 204  | 204  | -51  | -306 | -51  | -51  | 204  | 204  | -306 | -51  | -51  | 204  | -51  | 51   |
| -204 | -51  | -51  | 204  | 204  | -51  | -306 | -306 | -51  | -51  | -306 | -306 | -51  | -51  | -51  | 51   |
| -204 | -51  | -51  | 204  | 204  | 204  | -51  | -51  | -306 | -306 | -51  | -51  | 204  | 204  | -51  | 51   |
| -204 | -51  | -51  | 204  | 204  | 204  | 204  | 204  | -51  | -51  | -51  | 204  | -51  | -51  | -204 | 51   |
| -204 | -51  | -51  | -51  | 204  | 204  | 204  | 204  | -51  | -51  | 204  | -51  | 204  | 204  | -306 | 51   |
| -204 | -51  | 204  | 204  | -51  | -51  | -51  | -51  | -306 | -306 | -51  | -51  | -51  | -51  | -51  | 306  |
| -204 | -51  | -51  | 204  | -51  | -51  | 204  | -51  | -51  | -51  | 204  | 204  | -51  | -51  | 204  | 306  |
| -136 | 51   | 51   | 51   | 51   | 51   | 51   | 51   | 51   | -204 | -204 | -204 | 51   | 306  | 374  |      |

FIG. 19

| 0 | 0 | 0 | 0 | 0 | 0 | 0 | 0 | 0 | 0 | 0 | 0 | 0 | 0 | 1 | 1 |
|---|---|---|---|---|---|---|---|---|---|---|---|---|---|---|---|
| 0 | 0 | 0 | 0 | 0 | 0 | 0 | 0 | 0 | 0 | 0 | 1 | 0 | 0 | 1 | |
| 0 | 0 | 0 | 0 | 0 | 1 | 0 | 0 | 0 | 0 | 0 | 0 | 0 | 0 | | |
| 0 | 0 | 0 | 0 | 0 | 0 | 1 | 1 | 0 | 0 | 0 | 0 | 1 | 0 | | |
| 0 | 0 | 0 | 0 | 0 | 0 | 0 | 1 | 1 | 0 | 0 | 0 | 0 | | | |
| 0 | 0 | 0 | 0 | 0 | 0 | 0 | 0 | 1 | 1 | 0 | 0 | 0 | | | |
| 0 | 0 | 0 | 0 | 0 | 0 | 1 | 0 | 0 | 1 | 0 | 0 | 0 | | | |
| 0 | 0 | 0 | 0 | 0 | 1 | 0 | 0 | 1 | 0 | 0 | 1 | 0 | 0 | | |
| 0 | 0 | 0 | 0 | 0 | 0 | 1 | 0 | 0 | 0 | 1 | 0 | 0 | | | |
| 0 | 0 | 0 | 0 | 0 | 0 | 0 | 1 | 0 | 0 | 0 | 1 | 0 | 0 | | |
| 0 | 0 | 0 | 0 | 0 | 0 | 0 | 0 | 0 | 0 | 0 | 0 | 0 | | | |
| 0 | 0 | 0 | 0 | 1 | 0 | 0 | 0 | 0 | 0 | 0 | 0 | 0 | | | |
| 0 | 0 | 0 | 0 | 0 | 0 | 0 | 0 | 0 | 0 | 0 | 0 | 0 | | | |
| 0 | 0 | 0 | 0 | 0 | 0 | 0 | 0 | 0 | 0 | 0 | 0 | 0 | | | |
| 0 | 1 | 0 | 0 | 0 | 0 | 0 | 0 | 0 | 0 | 0 | 0 | 0 | | | |
| 0 | 0 | 0 | 0 | 0 | 0 | 0 | 0 | 0 | 0 | 0 | 0 | 0 | | | |

| f | a | b | g | h | c | d | e |
|---|---|---|---|---|---|---|---|
| c | d | e | f | a | b | g | h |
| b | g | h | c | d | e | f | a |
| e | f | a | b | g | h | c | d |
| h | c | d | e | f | a | b | g |
| a | b | g | h | c | d | e | f |
| d | e | f | a | b | g | h | c |
| g | h | c | d | e | f | a | b |

FIG. 24B

| 1 | 1 | 1/2 |
|---|---|---|
| 1 | 1 | 1 |
| 1/2 | 1 | 1 |

FIG. 24C

| f | a | b | g | h | c | d | e |
|---|---|---|---|---|---|---|---|
| c | d | e | f | a | b | g | h |
| b | g | h | c | d | e | f | a |
| e | f | a | b | g | h | c | d |
| h | c | d | e | f | a | b | g |
| a | b | g | h | c | d | e | f |
| d | e | f | a | b | g | h | c |
| g | h | c | d | e | f | a | b |

FIG. 24D

| 43 | 64 | 64 | 64 | 64 |
|---|---|---|---|---|
| 64 | 128 | 128 | 85 | 64 |
| 64 | 128 | 128 | 128 | 64 |
| 64 | 85 | 128 | 128 | 64 |
| 64 | 64 | 64 | 64 | 43 |

FIG. 25

IMAGE PROCESSING APPARATUS, IMAGE PROCESSING METHOD, AND HALFTONE PROCESSING

BACKGROUND OF THE INVENTION

1. Field of the Invention

The present invention relates generally to image processing apparatuses, image processing methods, programs, and storage media. More particularly, the present invention relates to a technique suitably used in detection of moirés caused by halftone processing.

2. Description of the Related Art

In these days, image data processed by personal computers (PCs) is often printed. However, the number of gray levels available to printers or displays to represent the image data of each pixel can be less than that available to the PCs. Accordingly, before the image data is output to the printers or the displays, halftone processing for converting image data of more gray levels into image data of less gray levels is often performed on the image data.

However, the halftone processing can cause moirés and, ultimately, deterioration of image quality. An ordered dithering method is one type of the available halftone processing. In the ordered dithering method, an output value is decided based on comparison of cyclically repeated thresholds with each pixel value. In an input image having a special frequency component close to that of the thresholds, the ordered dithering method causes a moiré corresponding to a difference between the spatial frequencies. An error diffusion method is also available as another type of the halftone processing. It is known that the error diffusion method causes a moiré of a repeated characteristic pattern in an output image of a flat input image having given color density.

As one of techniques for detecting occurrence of such a moiré, Japanese Patent Laid-Open No. 9-238259 has proposed a moiré detection method based on a difference between input image data and image data resulting from halftone processing. More specifically, in this method, difference data between the input image data and the image data resulting from the halftone processing is determined. Band-pass filtering processing is then performed on the difference data. In this way, a moiré component is extracted.

Another moiré detection method, such as one disclosed in Japanese Patent Laid-Open No. 2001-86355, is also available that performs visual-characteristic-based filtering processing on image data resulting from halftone processing to detect occurrence of a moiré. More specifically, in this method, input image data is phase-shifted by a half phase. The visual-characteristic-based filtering processing is performed on input image data having undergone the halftone processing and the phase-shifted image data having undergone the halftone processing. A difference between the filtering results is evaluated.

When input image data includes a frequency component close to that of a moiré component, determining whether the frequency component is the moiré component resulting from the halftone processing or is originally included in the input image data is difficult in the foregoing methods according to the related art. A printed image of image data having undergone the halftone processing may be copied or may be scanned with a scanner, processed, and then printed. In such cases, since resolution of the data input by copiers and scanners deteriorates, accurately detecting a moiré is also difficult in the foregoing methods according to the related art. Accordingly, in the related art, pattern detection is performed to detect dots and smoothing processing is performed on the dot-detected parts before the halftone processing.

Additionally, in the method using the visual characteristic-based filtering processing, the filtering processing is changed in accordance with resolution of output devices.

SUMMARY OF THE INVENTION

In view of the foregoing disadvantages, the present invention allows moirés to be evaluated simply and highly accurately.

An image processing apparatus includes a first halftone processor, a first filtering processor, a second filtering processor, and an evaluator. The first halftone processor generates first halftone image data from input image data using thresholds. The first filtering processor smoothes the first halftone image data using a first filter having a size corresponding to a cycle of the thresholds. The second filtering processor smoothes the input image data using a second filter having a characteristic corresponding to the first filter. The evaluator evaluates a moiré caused in the first halftone image data based on a difference between the first halftone image data smoothed by the first filtering processor and the image data smoothed by the second filtering processor.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 2 is a diagram illustrating an example of a threshold table for use in ordered dithering.

FIG. 3 is a diagram illustrating an example of input image data.

FIG. 4 is a diagram illustrating an example of halftone image data resulting from the ordered dithering.

FIG. 5 is a diagram illustrating an example of a 4×4 area including a target pixel.

FIG. 6 is a diagram illustrating an example of adding pixel data at an end of the halftone image data.

FIG. 7 is a diagram illustrating an example of image data resulting from first filtering processing.

FIG. 8 is a diagram illustrating an example of image data resulting from second filtering processing.

FIG. 9 is a diagram illustrating an example of difference image data.

FIG. 10 is a diagram illustrating an example of a moiré evaluation data.

FIG. 11 is a diagram illustrating an example of input image data free from occurrence of a moiré.

FIG. 12 is a diagram illustrating an example of difference image data without a moiré.

FIG. 14 is a diagram illustrating another example of image data resulting from second filtering processing.

FIG. 16 is a diagram illustrating an example of halftone image data resulting from the error diffusion.

FIG. 17 is a diagram illustrating another example of image data resulting from first filtering processing.

FIG. 18 is a diagram illustrating another example of difference image data.

FIG. 19 is a diagram illustrating another example of moiré evaluation data.

FIG. 20 is a diagram illustrating another example of a combination of thresholds used in the ordered dithering.

FIG. 21 is a diagram illustrating threshold data including the combination illustrated in FIG. 20.

FIG. 22 is a diagram illustrating an example of a combination of thresholds having a cyclically repeated cycle of eight rows and eight columns.

FIG. 23 is a diagram illustrating another example of an area subjected to calculation of a sum of pixel values regarding a target pixel.

FIGS. 24A and 24C are diagrams illustrating examples of areas subjected to filtering processing, whereas FIGS. 24B and 24D are diagrams illustrating examples of corresponding filter coefficients.

FIG. 25 is a diagram illustrating an example of a supercell threshold table.

DESCRIPTION OF THE EMBODIMENTS

Preferred embodiments of the present invention will now be described in detail in accordance with the accompanying drawings.

First Exemplary Embodiment

Figure 1:
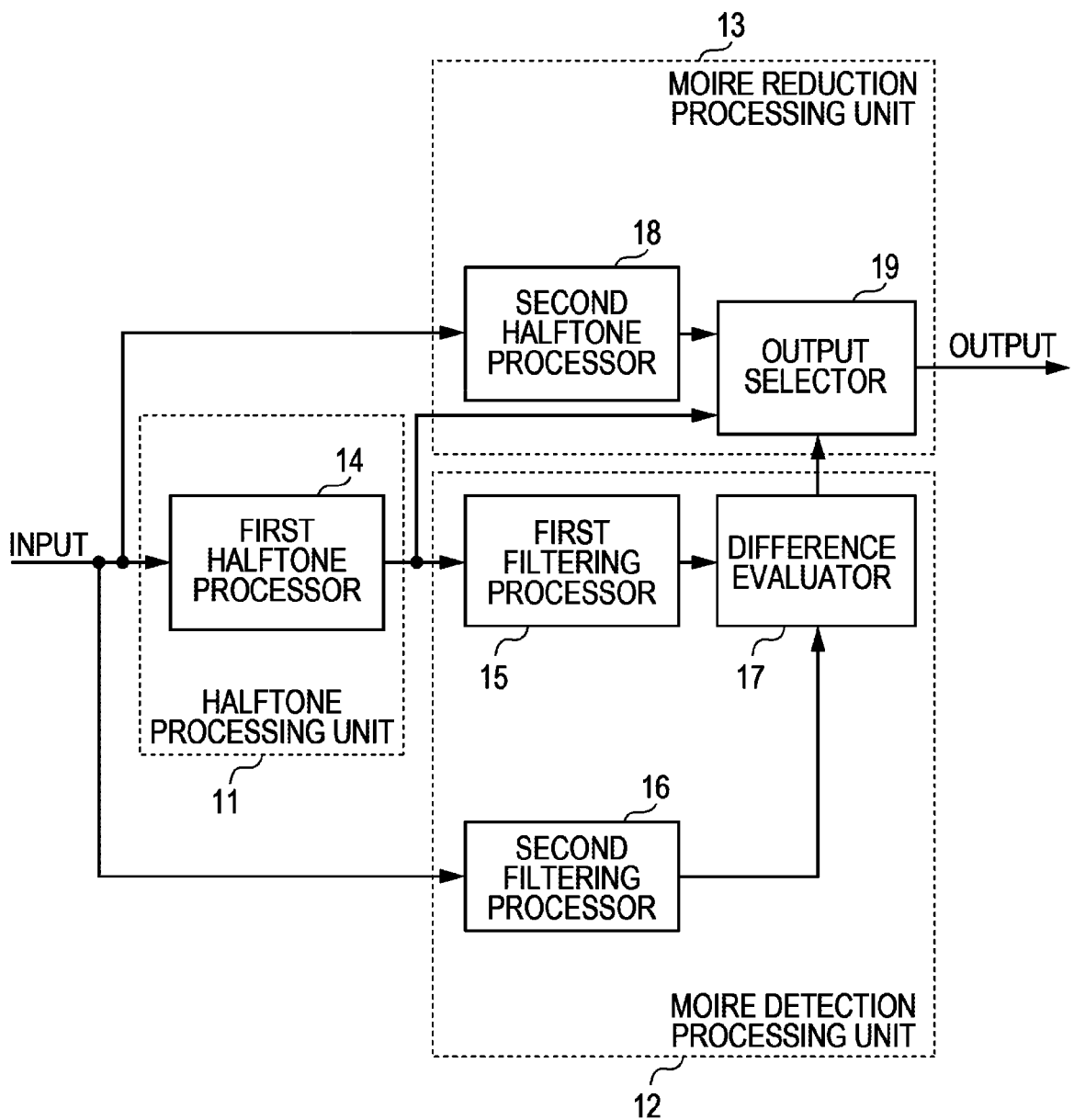
FIG. 1 is a block diagram illustrating an example of a configuration of an image processing apparatus according to an exemplary embodiment.

FIG. 1 is a block diagram illustrating an example of a configuration of an image processing apparatus 10 according to a first exemplary embodiment. Halftone is a reprographic technique that may simulate continuous tone imagery through the use of dots, varying either in size and/or in spacing. Moirés include an unintended and/or undesirable interference pattern that may emerge when two grids are superimposed over one another during digital imaging. Dither may include an intentionally applied form used to randomize quantization error to prevent large-scale, objectionable patterns in image.

Referring to FIG. 1, the image processing apparatus 10 includes a halftone processing unit 11, a moiré detection processing unit 12, and a moiré reduction processing unit 13. The halftone processing unit 11 includes a first halftone processor 14 serving as a first halftone processor. The first halftone processor 14 performs ordered-dithering-based halftone processing on input image data to generate halftone image data.

The moiré detection processing unit 12 includes a first filtering processor 15, a second filtering processor 16, and a difference evaluator 17. The first filtering processor 15 calculates a sum of pixel values of a target pixel and predetermined pixels adjacent to the target pixel in the halftone image data generated by the halftone processing unit 11. The second filtering processor 16 calculates a sum of pixel values of the target pixel and the predetermined adjacent pixels in the input image data, which correspond to those subjected to the calculation of the sum performed by the first filtering processor 15. Each of the first filtering processor 15 and the second filtering processor 16 serves as a finite impulse response (FIR) filter, where each FIR filter may operate as a discrete-time filter whose response to a Kronecker delta input is the impulse response and that impulse response is finite because it settles to zero in a finite number of sample intervals.

The difference evaluator 17 evaluates a difference between the result of the processing by the first filtering processor 15 and the result of the processing by the second filtering processor 16 to detect occurrence of a moiré. At this time, to cancel an influence of a decrease in the number of gray levels due to the halftone processing by the halftone processing unit 11, the difference evaluator 17 normalizes the processing results of the first and second filtering processors 15 and 16, respectively, and then calculates the difference. The difference evaluator 17 outputs a moiré detection signal if an absolute value of the calculated difference exceeds a predetermined threshold. The predetermined threshold may be a value decided in advance that represents a marked level or point.

The moiré reduction processing unit 13 includes a second halftone processor 18 serving as a second halftone processor and an output selector 19. In case a moiré is caused because of the halftone processing by the first halftone processor 14 of the halftone processing unit 11, the second halftone processor 18 performs halftone processing having a different characteristic. This exemplary embodiment adopts, but not limited to, an error diffusion method. For example, ordered dithering based on a threshold cycle different from that of the ordered dithering used by the first halftone processor 14 may be used.

Based on the moiré detection result determined by the difference evaluator 17, the output selector 19 selectively outputs one of the result of the halftone processing by the first halftone processor 14 and the result of the halftone processing by the second halftone processor 18. More specifically, if the difference evaluator 17 does not detect a moiré, the output selector 19 selects the halftone processing result (i.e., first halftone image data) of the first halftone processor 14. In contrast, if the difference evaluator 17 detects a moiré, the output selector 19 selects the halftone processing result (i.e., second halftone image data) of the second halftone processor 18.

In the image processing apparatus 10 according to this exemplary embodiment, the moiré reduction processing unit 13 replaces the halftone processing result of the halftone processing unit 11 with another halftone processing result if the moiré detection processing unit 12 detects a moiré. In this way, the image processing apparatus 10 can provide halftone processing less likely to cause a moiré than the halftone processing performed by the halftone processing unit 11 alone.

Each component will be described in detail below.

The first halftone processor 14 constituting the halftone processing unit 11 converts input image data represented with 256 gray levels, i.e., input image data including pixels each having a pixel value ranging from 0 to 255, into halftone image data represented with three gray levels ranging from 0 to 2. In the input image data, a pixel value "0" represents black, whereas a pixel value "255" represents white. In the halftone image data, the pixel value "0" represents black, whereas a pixel value "2" represents white.

Although the description is given for an example of converting image data of 256 gray levels into halftone image data of three gray levels in this exemplary embodiment, image data of different gray levels may be used. Additionally, this exemplary embodiment may be applied to color image data by performing similar processing on each color component.

The first halftone processor 14 selects a row and a column of a threshold table illustrated in FIG. 2 in accordance with remainders of division of a row number and a column number corresponding to a position of a pixel in the input image data by 4, respectively, to obtain a pair of thresholds. More specifically, a given threshold is used for the 0th and 4th rows, whereas another threshold is used for the 1st and 5th rows. The same applies to the columns. More specifically, a given threshold is used for the 0th and 4th columns, whereas another threshold is used for the 1st and 5th columns. Accordingly, thresholds illustrated in FIG. 2 are repeated every four rows and every four columns.

The first halftone processor 14 compares each input pixel value and the two thresholds. If the input pixel value is smaller than both of the thresholds, the first halftone processor 14 outputs a halftone pixel value "0". If the input pixel value is equal to or larger than one of the thresholds and is smaller than the other one, the first halftone processor 14 outputs a halftone pixel value "1". If the input pixel value is equal to or larger than both of the thresholds, the first halftone processor 14 outputs a halftone pixel value "2".

FIG. 3 is a diagram illustrating an example of input image data. Since pixel values are repeated every three pixels in the input image data illustrated in FIG. 3, dithering processing using thresholds repeated every four pixels illustrated in FIG. 2 causes a moiré.

For example, a pixel 31 at the 0th row and the 6th column has a pixel value "255". Since remainders resulting from division of the row number and the column number by 4 are "0" and "2", respectively, the first halftone processor 14 compares a threshold pair "20, 148" at the 0th row and the 2nd column with the pixel value "255" and outputs the halftone pixel value "2".

Additionally, a pixel 32 at the 0th row and the 7th column has a pixel value "191". The first halftone processor 14 compares a threshold pair "116, 244" at the 0th row and the 3rd column with the pixel value "191" and outputs the halftone pixel value "1".

The first halftone processor 14 performs the foregoing dithering processing regarding each pixel position to obtain halftone image data illustrated in FIG. 4 from the input image data illustrated in FIG. 3. Although the description has been given for the example of using the thresholds having a cycle of four rows and four columns (i.e., the 4×4 cycle) to output three values in this exemplary embodiment, thresholds having cycles other than the 4×4 cycle may be used in the dithering processing performed by the first halftone processor 14. The number of gray levels resulting from the dithering processing is not limited to three.

Content of the processing performed by the moiré detection processing unit 12 will now be described.

Regarding each pixel of the halftone image data resulting from the halftone processing by the first halftone processor 14, the first filtering processor 15 calculates a sum of halftone pixel values in an area constituted by four rows and four columns (i.e., a 4×4 area) including a target pixel illustrated in FIG. 5. At this time, the size of the processing-target area is set equal to the cycle of the thresholds used by the first halftone processor 14, i.e. the 4×4 area. By setting the size of the area equal to the cycle of the thresholds, the filter order of an integral multiple of the cycle in the row and column directions is set.

For example, just like when a pixel 41 at the 0th row and the 1st column in FIG. 4 is set as a target pixel, the 4×4 area including the target pixel illustrated in FIG. 5 may run off the area of the halftone image data. In such a case, as illustrated in FIG. 6, pixel values outside the halftone image data are added by reflecting the pixel values about an end of the halftone image data.

FIG. 6 is a diagram illustrating an example of adding reflected image data (i.e., a dotted-line part) to the halftone image data at an upper left part (i.e., a solid-line part) illustrated in FIG. 4. For example, regarding a pixel 61 outside the halftone image data, a halftone pixel value of a pixel 65 symmetrical to the pixel 61 about a pixel 63 located at an end of the halftone image data is used. Similarly, regarding a pixel 62 outside the halftone image data, a halftone pixel value of a pixel 64 symmetrical to the pixel 62 about the pixel 63 located at the end of the halftone image data is used.

In this way, the first filtering processor 15 calculates a sum of the halftone pixel values in an area of a thick-line frame 66 when the pixel 41 at the 0th row and the 1st column in FIG. 4 is set as the target pixel. The first filtering processor 15 calculates the sum of the halftone pixel values for every target pixel in the foregoing manner to smooth the halftone image data illustrated in FIG. 4 and obtain image data resulting from the first filtering processing (hereinafter, referred to as first filtering-processed image data) illustrated in FIG. 7.

The second filtering processor 16 calculates a sum of pixel values in a 4×4 area including a target pixel for each pixel of the input image data. The processing performed by the second filtering processor 16 is similar to the one performed by the first filtering processor 15 except for that the processing target is the input image data instead of the halftone image data. The second filtering processor 16 calculates a sum of the pixel values for each target pixel in the foregoing manner to smooth the input image data illustrated in FIG. 3 and obtain image data resulting from the second filtering processing (hereinafter, referred to as second filtering-processed image data) illustrated in FIG. 8.

The difference evaluator 17 evaluates a difference between the first filtering-processed image data and the second filtering-processed image data. The number of gray levels of the halftone image data resulting in the first filtering-processed image data is three (with minimum and maximum values equal to 0 and 2, respectively), whereas the number of gray levels of the input image data resulting in the second filtering-processed image data is 256 (with minimum and maximum values equal to 0 and 255, respectively). Accordingly, the difference evaluator 17 normalizes the first and second filtering-processed image data so that the maximum values are equal to 510. More specifically, each element of the first filtering-processed image data is multiplied by 255 (510÷2=255), whereas each element of the second filtering-processed image data is multiplied by 2 (510÷255=2). After performing the normalization, the difference evaluator 17 calculates the difference between the first filtering-processed image data and the second filtering-processed image data to obtain difference image data illustrated in FIG. 9. In the difference image data illustrated in FIG. 9, negative and positive values having relatively large absolute values (values around −260 and 250) appear cyclically. Accordingly, parts having high color density and parts having low color density are repeated cyclically in the halftone image data compared with the input image data. Such a change in the color density is visually recognized as a moiré.

The difference evaluator 17 determines that a moiré occurs regarding a pixel if a corresponding element in the difference image data has an absolute value equal to or larger than a predetermined threshold and sets moiré evaluation data equal to "1". In this exemplary embodiment, the threshold used in the moiré detection is set equal to 200. The difference evaluator 17 obtains the moiré evaluation data illustrated in FIG. 10 from the difference image data illustrated in FIG. 9.

FIG. 11 illustrates an example of input image data free from a moiré caused by dithering processing using four-pixel-cycle thresholds illustrated in FIG. 2. Difference image data illustrated in FIG. 12 is ultimately obtained from the foregoing processing performed on the input image data illustrated in FIG. 11. Referring to FIG. 12, although relatively large values, i.e., values around 170, appear at end parts, small values appear in most of the data. The relatively large values at the end parts result from an influence of reflection processing illustrated in FIG. 6. As described above, the moiré detection processing unit 12 according to this exemplary embodiment can detect a moiré.

The moiré reduction processing unit 13 will be described below.

As described above, the second halftone processor 18 performs the error-diffusion-based halftone processing on the input image data to obtain error diffused image data. The output selector 19 selects output pixel values in accordance with the moiré evaluation data generated by the difference evaluator 17. More specifically, if the value of the target pixel in the moirè evaluation data is equal to "1", the output selector 19 selects a pixel value in the error diffused image data obtained by the second halftone processor 18. If the value of the target pixel in the moiré evaluation data is equal to "0", the output selector 19 selects a pixel value of the halftone image data obtained by the first halftone processor 14.

With the foregoing configuration, the image processing apparatus 10 smoothes the halftone image data in accordance with the cycle of the thresholds used in the halftone processing to obtain color density represented with the halftone processing cycle. Similarly, the image processing apparatus 10 smoothes the input image data in accordance with the cycle of the thresholds used in the halftone processing to obtained color density represented with the halftone processing cycle. The image processing apparatus 10 calculates a difference between the two color density values to determine an amount of a color-density change caused by the halftone processing and treats the determined amount of the color-density change as moiré intensity. In this way, the image processing apparatus 10 can accurately detect intensity of the moiré without using screen ruling or resolution but using a simple method. Accordingly, the image processing apparatus 10 can obtain a better halftone processing result than a configuration with the halftone processing unit 11 but without the moiré detection processing unit 12 and the moiré reduction processing unit 13.

Figure 20:
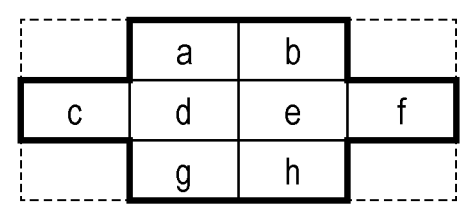

Although the thresholds having the cycle illustrated in FIG. 2 are used in this exemplary embodiment, eight thresholds "a-h" used by the first halftone processor 14 may be arranged in a rectangular shape without four corners as illustrated in FIG. 20, for example. The unit cell illustrated in FIG. 20 can also fill the plane as illustrated in FIG. 21.

Figure 21:
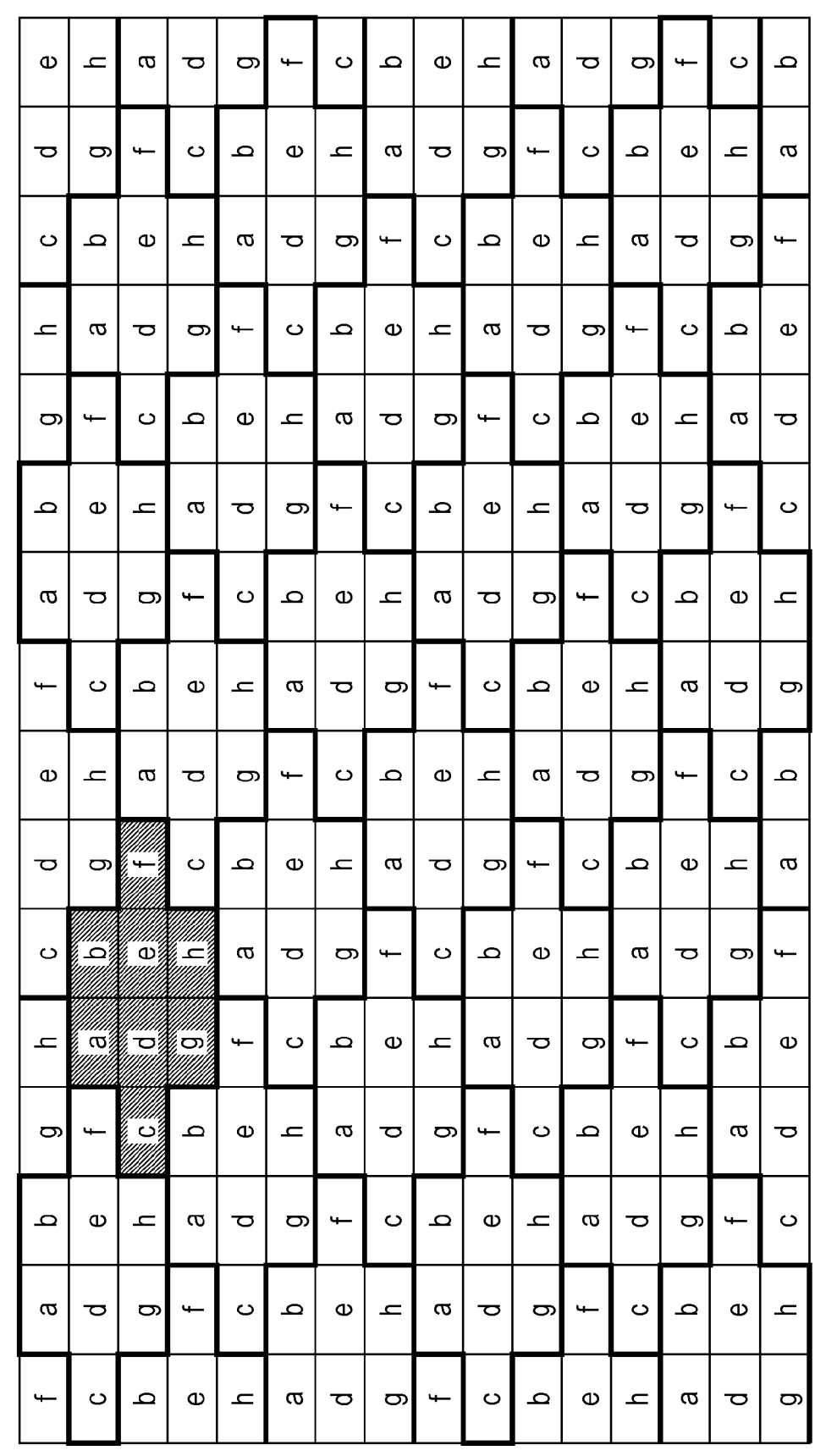
Figures 22, 23:
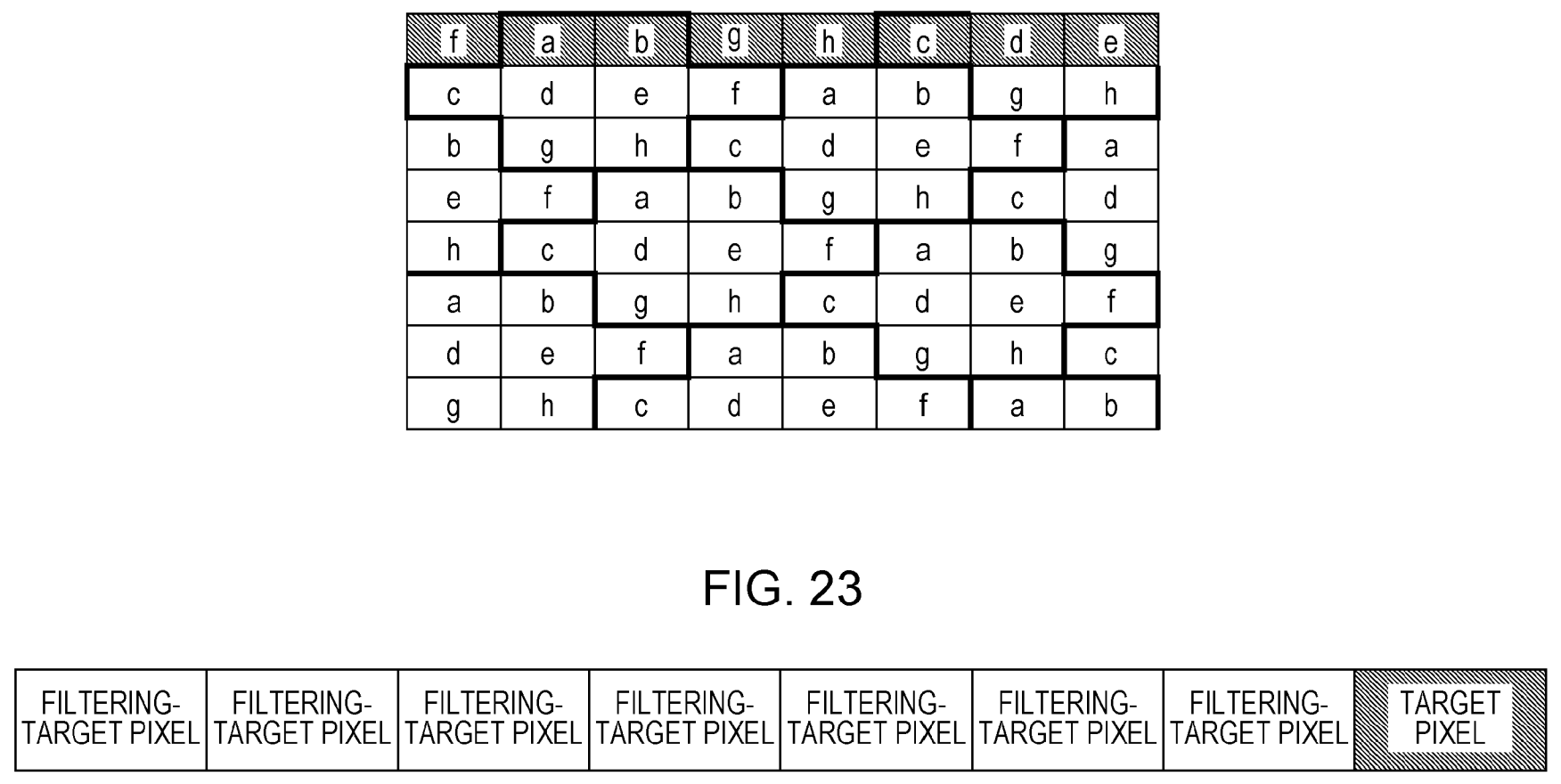

The data illustrated in FIG. 21 includes repetition of 8×8 areas as illustrated in FIG. 22. Each of the eight thresholds "a-h" appears once in a shaded area in FIG. 22. Similarly, the eight thresholds "a-h" appear once on each row or each column illustrated in FIG. 22. Accordingly, the area illustrated in FIG. 22 includes the same number of thresholds "a-h". In such a case, when a 1×8 area including a target pixel is set as an area subjected to the calculation of the sum as illustrated in FIG. 23, the each of the eight thresholds "a-h" appears in the area once. Accordingly, the first filtering processor 15 and the second filtering processor 16 may set the area illustrated in FIG. 23 as the subject of the filtering processing instead of the area illustrated in FIG. 20.

Alternatively, a 3×3 rectangular area around a shaded target pixel, i.e., an area enclosed by a double-line frame, illustrated in FIG. 24A or a 5×5 rectangular area around the shaded target pixel, i.e., an area enclosed by the double-line frame, illustrated in FIG. 24C may be subjected to the filtering processing.

In the 3×3 rectangular area, the threshold "a" appears twice, whereas each of the other thresholds "b-h" appears once. When the target pixel is moved, the same threshold is located on the upper right and lower left of the target pixel but different thresholds are located at the rest of the rectangular area. Accordingly, in a spatial filter used by the first filtering processor 15 and the second filtering processor 16, a weight "½" is set at the positions where the same threshold appears twice and a weight "1" is set at the other positions just like in a coefficient matrix illustrated in FIG. 24B. Since the spatial filtering processing using the coefficient matrix illustrated in FIG. 24B yields a constant average of each of the thresholds in the filtering-processing target area regardless of the position of the target pixel, an influence of the halftone thresholds can be eliminated from the first and second filtering-processed image data.

In the 5×5 rectangular area, the threshold "a" appears four times, whereas each of the other thresholds "b-h" appears three times. The weights in the spatial filter used by the first filtering processor 15 and the second filtering processor 16 are set based on the threshold appearing frequency and a distance to the target pixel just like in a coefficient matrix illustrated in FIG. 24D.

More specifically, regarding the threshold "a" appearing four times in the rectangular area, a weight "85" is set at two positions adjacent to the target pixel and a weight "43" is set at two other positions so that a sum of the weights for the threshold "a" is equal to 256. Regarding each of the thresholds "b-h", other than the threshold "a", appearing three times in the rectangular area, a weight "128" is set at a position of the target pixel or a position adjacent to the target pixel and a weight "64" is set at two other positions so that a sum of the weights for each threshold is equal to 256 just like the threshold "a".

Figure 25:
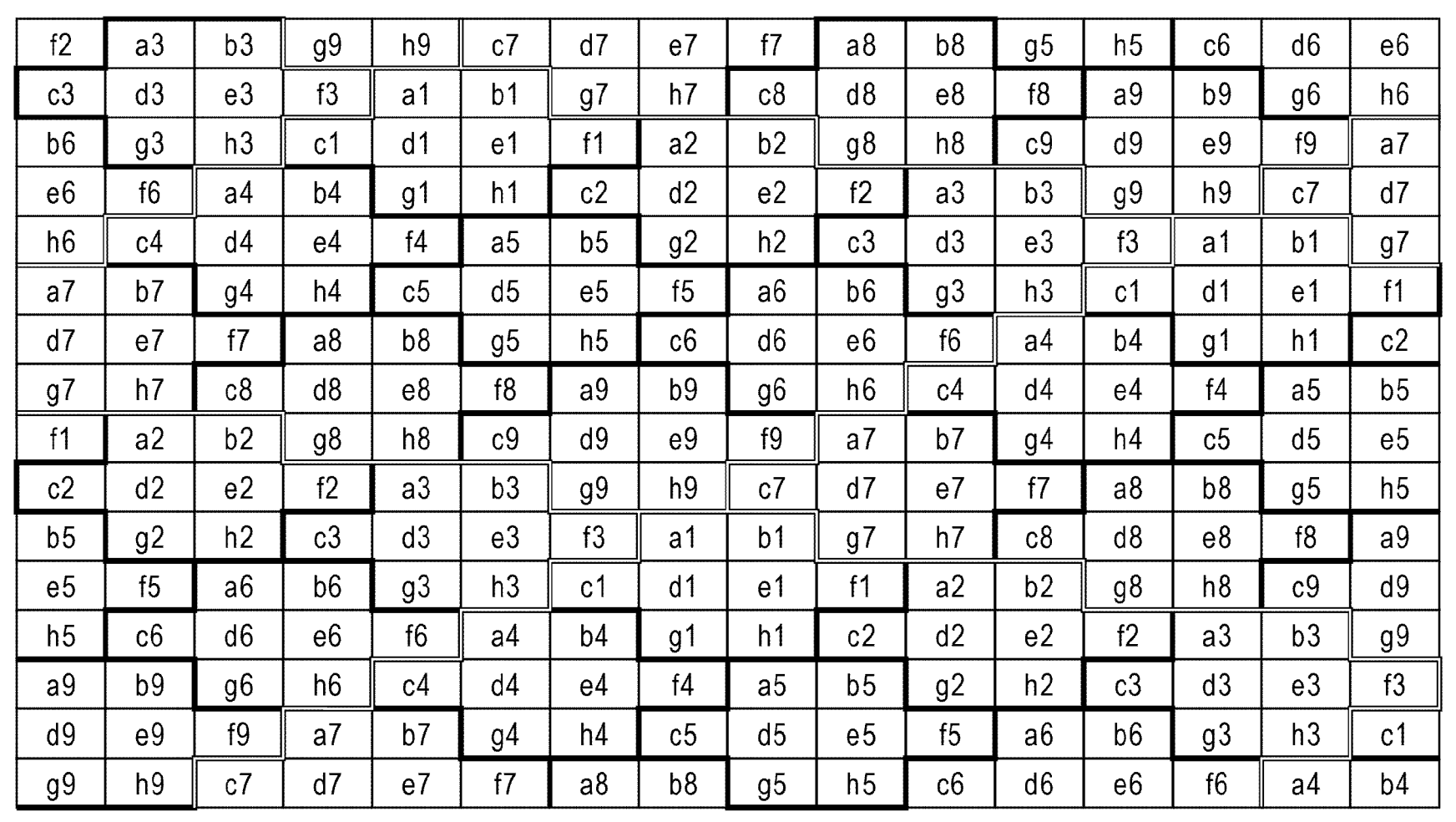

A supercell method is also available that sets dithering thresholds by combining a short-term change and a long-term change. More specifically, in the supercell method, thresholds including the short-term change illustrated in FIG. 21 and the long-term change illustrated in FIG. 25 are used. An average of thresholds "a1-a9" in FIG. 25 is set equal to the threshold "a" in FIG. 21. The same applies to other thresholds "b1-h9" in FIG. 25. More specifically, each average is equal to corresponding one of the thresholds "b-h" in FIG. 21.

By ignoring the long-term change (setting amplitude to 0), the thresholds "a1-a9" in FIG. 25 can be represented by the threshold "a" (i.e., a quantization representative threshold) in FIG. 21. The same applies to the other thresholds "b1-h9" in FIG. 25. The use of the quantization representative thresholds illustrated in FIG. 21 instead of the thresholds in FIG. 25 can realize the processing similar to the above-described one.

Second Exemplary Embodiment

A second exemplary embodiment will be described below. Since an image processing apparatus according to this exemplary embodiment has a configuration similar to that illustrated in FIG. 1, the description thereof is omitted. In this exemplary embodiment, a first halftone processor 14 converts input image data represented with 256 gray levels, i.e., values ranging from 0 to 255, into halftone image data represented with two gray levels, i.e., values 0 or 1, using an error diffusion method. A moiré detection processing unit 12 then detects a moiré caused in the halftone image data. A second halftone processor 18 generates halftone image data using an ordered dithering method. Instead of the ordered dithering method, the second halftone processor 18 may use error diffusion having different quantization-error distribution coefficients.

Figure 13:
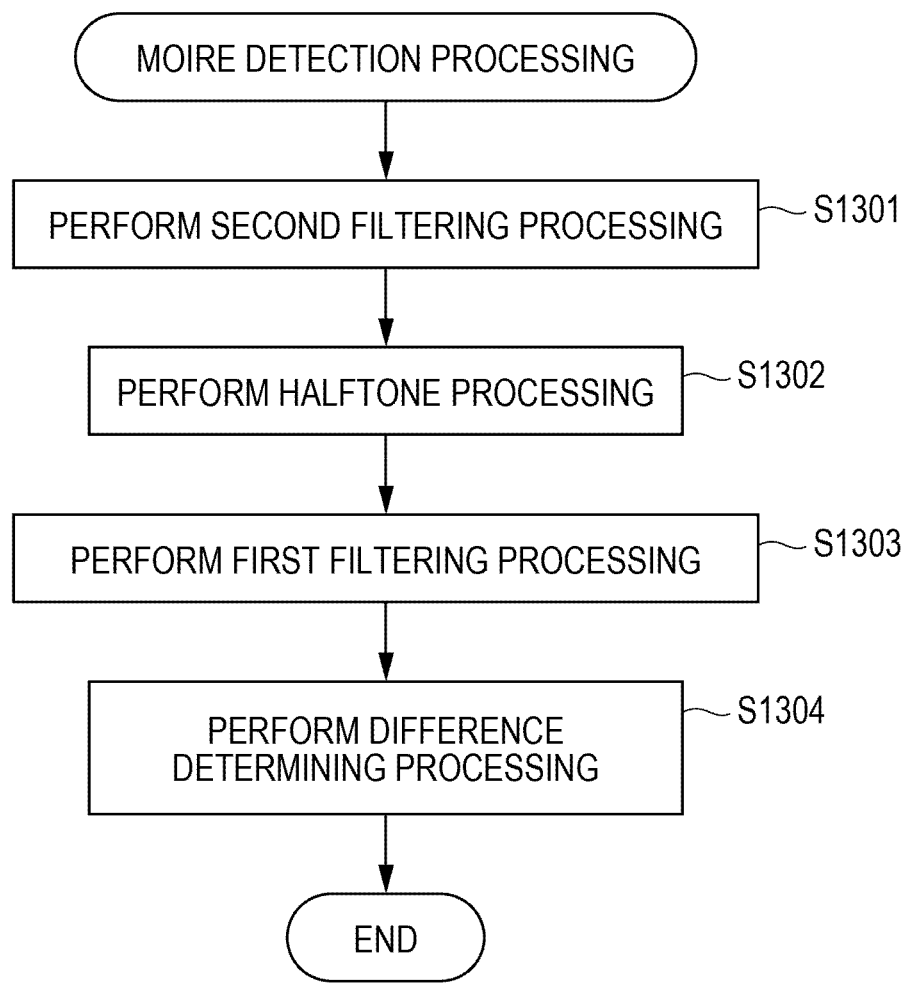
FIG. 13 is a flowchart illustrating an example of a procedure for detecting a moiré.

FIG. 13 is a flowchart illustrating an example of a procedure for detecting a moiré in accordance with this exemplary embodiment.

In STEP S1301, a second filtering processor 16 performs second filtering processing on each pixel of input image data. More specifically, the second filtering processor 16 calculates a sum of pixel values of nine pixels, namely, a target pixel and eight pixels adjacent to the target pixel in upper, lower, right, left, and oblique directions. When the target pixel does not have adjacent pixels within the input image data because the target pixel is located at an end of the input image data, it is assumed that the adjacent pixels have a pixel value "0".

In this exemplary embodiment, a description is given for an example of input image data constituted by 16×16 pixels each having a pixel value "34". The second filtering processing on the input image data yields second filtering-processed image data illustrated in FIG. 14. Although the sum of the nine pixel values of the target pixel and the eight pixels adjacent to the target pixel in upper, lower, right, left, and oblique directions is calculated in this exemplary embodiment, smoothing filtering processing different from this one may be used in the second filtering processing.

In STEP S1302, the first halftone processor 14 compares the sum of the pixel value of the target pixel and an error value distributed from the adjacent pixel with a predetermined threshold sequentially from an upper left part toward a lower right part of the input image data. In this exemplary embodiment, the threshold is set equal to 128. If the sum of the pixel value of the target pixel and the error value is equal to or larger than the threshold "128", the first halftone processor 14 sets a corresponding halftone pixel value of halftone image data equal to "1". If the sum of the pixel value and the error value is smaller than 128, the first halftone processor 14 sets the corresponding halftone pixel value of the halftone image data equal to "0".

Figure 15:
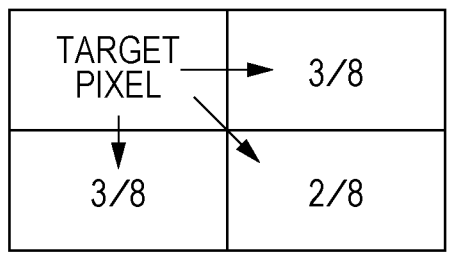
FIG. 15 is a diagram illustrating an example of error distribution ratios in error diffusion.

The first halftone processor 14 also sets the sum of the pixel value of the target pixel and the error value distributed from the adjacent pixel as a quantization error value when the halftone pixel value is equal to "0". When the halftone pixel value is equal to "1", the first halftone processor 14 sets a value obtained by subtracting 255 from the sum of the pixel value and the error value as the quantization error value. The quantization error value is distributed to the adjacent pixels in the right, lower, and lower right directions in accordance with distribution coefficients corresponding to the positions of the adjacent pixels in the right, lower, and lower right directions, respectively. FIG. 15 illustrates a relation between the pixel positions and the distribution coefficients of the quantization error value. In this way, the halftone image data illustrated in FIG. 16 is obtained from the input image data with the error diffusion method.

Referring back to FIG. 13, the halftone processing is performed in STEP S1302 after the second filtering processing in STEP S1301. However, these steps do not depend on one another; the steps may be switched or may be performed in parallel.

In STEP S1303, a first filtering processor 15 performs first filtering processing. More specifically, the first filtering processor 15 performs filtering processing similar to that in STEP S1301 on the halftone image data generated in STEP S1302. A difference between STEPs S1301 and S1303 is that the processing target is changed from the input image data to the halftone image data. Through the processing in STEP S1303, first filtering-processed image data illustrated in FIG. 17 is generated from the halftone image data illustrated in FIG. 16.

In STEP S1304, a difference evaluator 17 calculates a difference between the first filtering-processed image data and the second filtering-processed image data and then compares the difference with a predetermined threshold to generate moiré evaluation data. In STEP S1304, the difference evaluator 17 first performs normalization to calculate the difference. More specifically, to set the first filtering-processed image data resulting from the halftone image data having a pixel value "0" or "1" equal to the second filtering-processed image data resulting from the input image data having a pixel value ranging from 0 to 255, each element of the first filtering-processed image data is multiplied by 255.

After normalizing the first filtering-processed image data illustrated in FIG. 17, the difference evaluator 17 calculates the difference between the normalized image data and the second filtering-processed image data illustrated in FIG. 14 to obtain difference image data illustrated in FIG. 18.

The difference evaluator 17 then performs a comparison on each pixel in the difference image data illustrated in FIG. 18. If the pixel value of the target pixel is equal to or larger than a threshold "256", the difference evaluator 17 sets a corresponding pixel value in moiré evaluation data equal to "1". If the pixel value of the target pixel is smaller than 256, the difference evaluator 17 sets the corresponding pixel value equal to "0". The difference evaluator 17 performs such determination on every pixel to obtain the moiré evaluation data illustrated in FIG. 19. Although the moiré evaluation data represented with 0 or 1 is generated based on one threshold in this exemplary embodiment, moiré evaluation data represented with three or more levels may be generated in accordance with the intensity of the moiré using a plurality of thresholds.

As described before, the second halftone processor 18 performs the ordered-dithering-based halftone processing on the input image data. An output selector 19 selects a pixel value to be output in accordance with the moiré evaluation data generated by the difference evaluator 17. More specifically, if the value of the target pixel in the moiré evaluation data is equal to "1", the output selector 19 selects the pixel value of the halftone image data generated by the second halftone processor 18. If the value of the target pixel in the moiré evaluation data is equal to "0", the output selector 19 selects the pixel value of the halftone image data generated by the first gray-level conversion processor 14.

With the foregoing configuration, the image processing apparatus according to this exemplary embodiment can provide a better halftone processing result than a configuration with the halftone processing unit 11 but without the moiré detection processing unit 12 and the moiré reduction processing unit 13.

Other Exemplary Embodiments

A central processing unit (CPU) executes processing based on a program stored on a random access memory (RAM) or a read-only memory (ROM) of a computer, whereby each processing unit constituting the image processing apparatus 10 illustrated in FIG. 1 according to the foregoing exemplary embodiments and each step of the flowchart illustrated in FIG. 13 can be realized. The program and a computer-readable storage medium storing the program are also included. In an example, a computer-readable medium or a computer-readable storage medium may store a program that causes an image processing apparatus to perform a method described herein. In another example, a CPU may be configured to control at least one unit utilized in a method or apparatus described herein. Each apparatus may be implemented within, include, or otherwise be connected to the CPU, where the CPU is connected to a memory and executes a variety of functions by executing a variety of application programs that are stored in the memory, such as the ROM. The ROM may store such information as an operating system, various applications, a control program, and data. The operating system may be the software that controls the allocation and usage of hardware resources such as memory, central processing unit, disk space, and peripheral devices. The RAM may temporarily store the program or the data that is loaded from the ROM. The RAM also is used as a space wherein the CPU executes the variety of programs.

As many apparently widely different embodiments can be made without departing from the spirit and scope thereof, it is to be understood that the invention is not limited to the specific embodiments thereof except as defined in the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298745 filed Dec. 28, 2009 and No. 2010-227679 filed Oct. 7, 2010, which are hereby incorporated by reference herein in their entirety.

What is claimed is:

1. An image processing apparatus, comprising:
a first halftone processor configured to generate first halftone image data from input image data using thresholds;
a first filtering processor configured to smooth the first halftone image data using a first filter having a size corresponding to a cycle of the thresholds;
a second filtering processor configured to smooth the input image data using a second filter having a characteristic corresponding to the first filter; and
an evaluator configured to evaluate a moiré caused in the first halftone image data based on a difference between the first halftone image data smoothed by the first filtering processor and the image data smoothed by the second filtering processor.

2. The image processing apparatus according to claim 1, further comprising:
a second halftone processor configured to generate second halftone image data from the input image data in accordance with a method different from the one used by the first halftone processor; and
a selector configured to select the first halftone image data or the second halftone image data based on an evaluation result of the evaluator.

3. The image processing apparatus according to claim 2, wherein
the first halftone processor generates the first halftone image data using a dithering method, whereas the second halftone processor generates the second halftone image data using an error diffusion method as a method different from the one used by the first halftone processor.

4. The image processing apparatus according to claim 1, wherein the first filter serves as a finite impulse response filter, an order of the finite impulse response filter being equal to an integral multiple of the cycle of the thresholds.

5. The image processing apparatus according to claim 1, wherein a sum of coefficients for each of the thresholds indicates a same value in the first filter.

6. The image processing apparatus according to claim 1, wherein the coefficients in the first filter are set based on a distance from a target pixel.

7. The image processing apparatus according to claim 1, wherein the first filtering processor smoothes the first halftone image data using an image area including cyclically repeated thresholds different from one another, the image area including a same number of thresholds.

8. An image processing method, comprising:
generating first halftone image data from input image data using thresholds;
smoothing the generated first halftone image data using a first filter having a size corresponding to a cycle of the thresholds;
smoothing the input image data using a second filter having a characteristic corresponding to the first filter; and
evaluating a moiré caused in the first halftone image data based on a difference between the smoothed first halftone image data and the smoothed input image data.

9. The image processing method according to claim 8, further comprising:
generating second halftone image data from the input image data in accordance with a method different from the one used to generate the first halftone image data; and
selecting the first halftone image data or the second halftone image data based on an evaluation result.

10. The image processing method according to claim 8, wherein a sum of coefficients for each of the thresholds indicates a same value in the first filter.

11. The image processing method according to claim 8, wherein the coefficients in the first filter are set based on a distance from a target pixel.

12. A non-transitory computer-readable medium storing a computer program that causes a computer to execute a method according to claim 8.

13. The image processing apparatus according to claim 1, wherein a size of the first filter is larger than or equal to a size corresponding to the threshold.

14. The image processing apparatus according to claim 1, wherein the first filter and the second filter have the same filter characteristic.

15. The image processing apparatus according to claim 1, wherein the first halftone processor performs halftone processing using an ordered dithering method.

16. The image processing apparatus according to claim 1, wherein the evaluator evaluates whether moiré has occurred.

17. The image processing apparatus according to claim 16, wherein the evaluator determines that moiré has occurred, in a case where the difference is larger than the threshold.

* * * * *